Dec. 31, 1963     J. F. ENGLER     3,115,738
MOWING DEVICE
Original Filed June 15, 1959     4 Sheets-Sheet 1
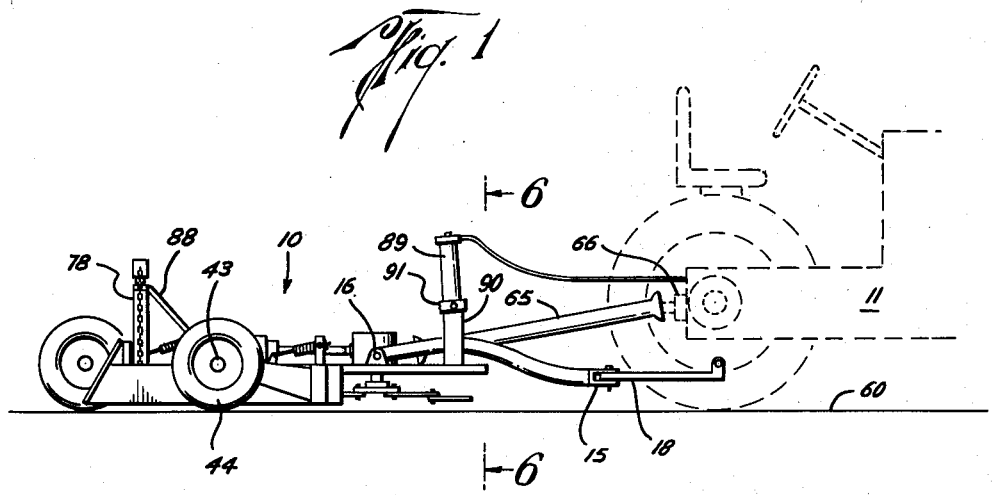
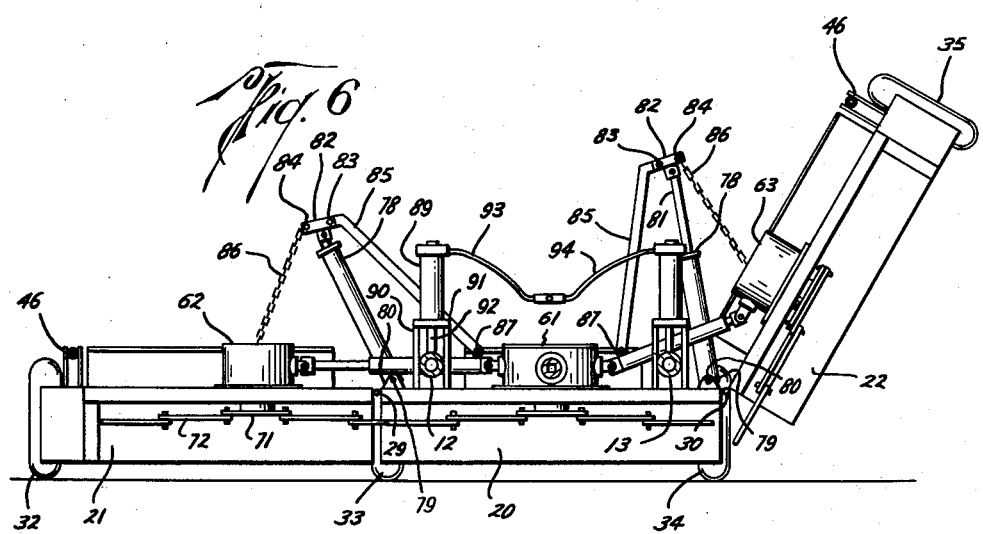
John F. Engler
INVENTOR.
BY
ATTORNEY

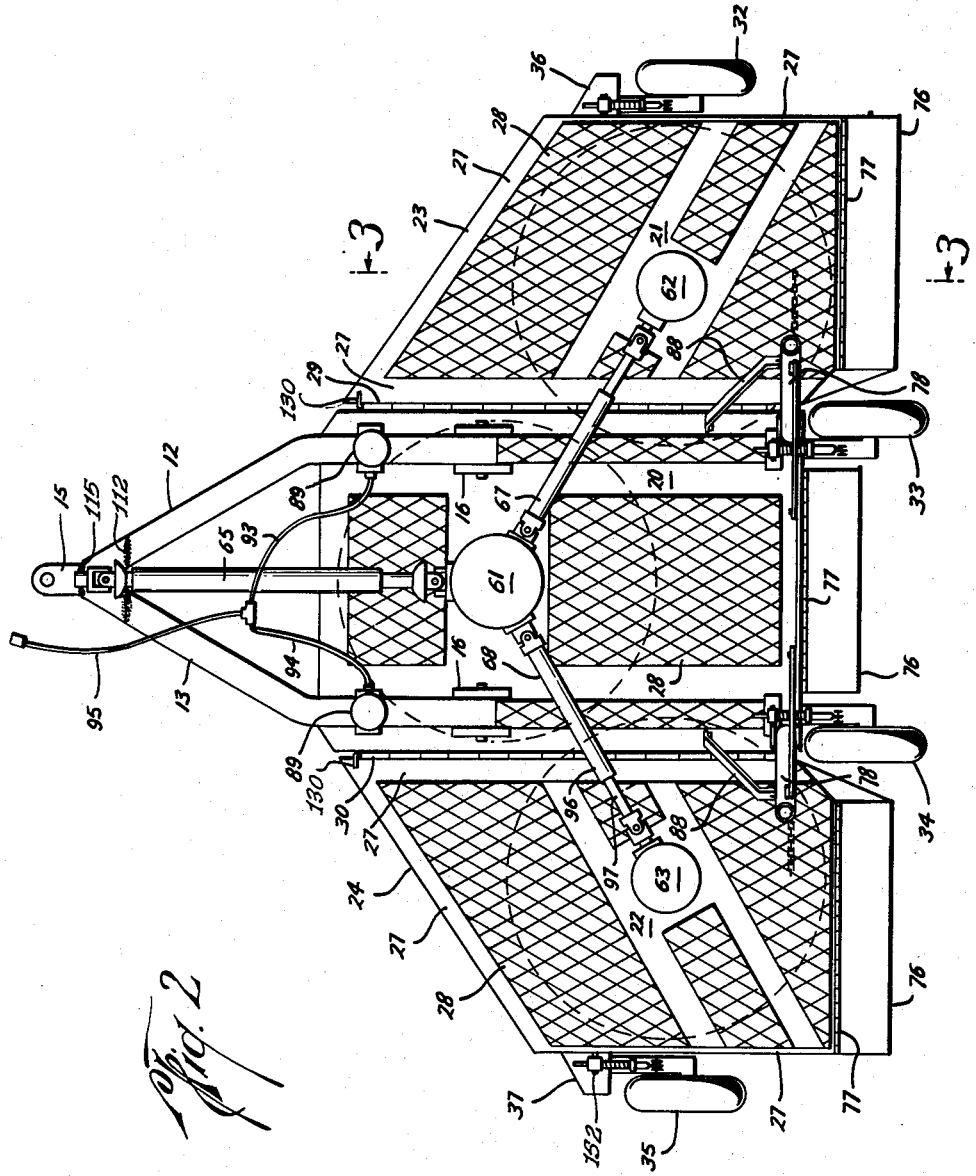

Dec. 31, 1963     J. F. ENGLER     3,115,738
MOWING DEVICE
Original Filed June 15, 1959     4 Sheets-Sheet 3
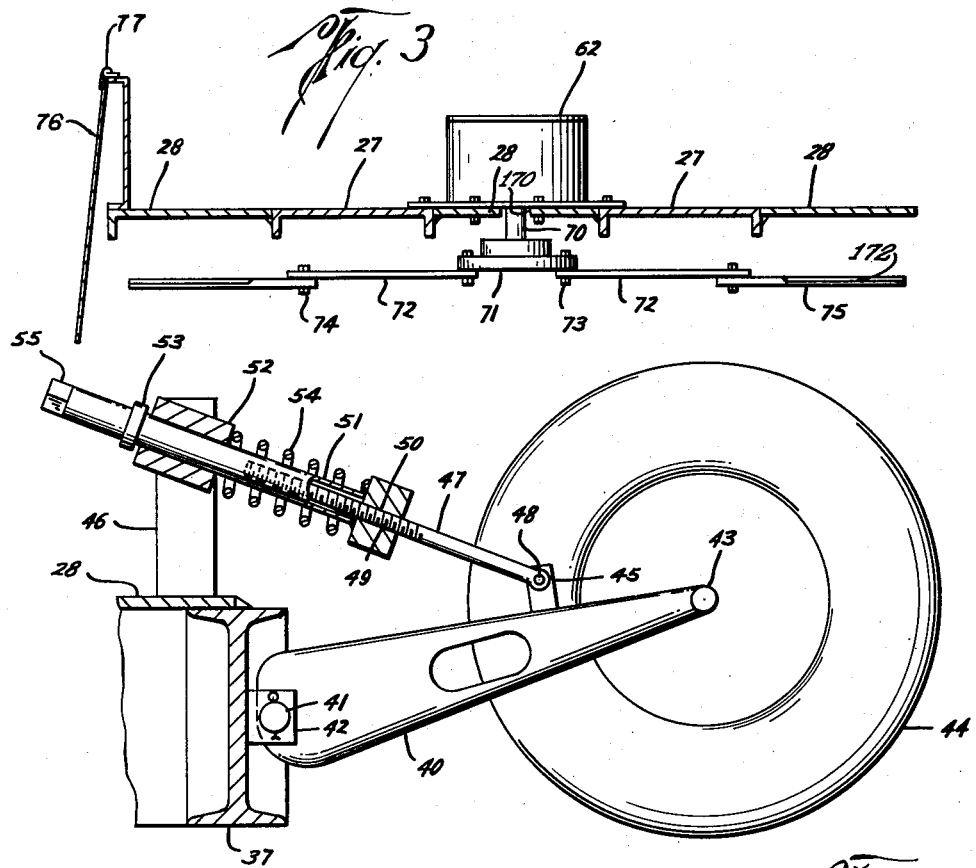
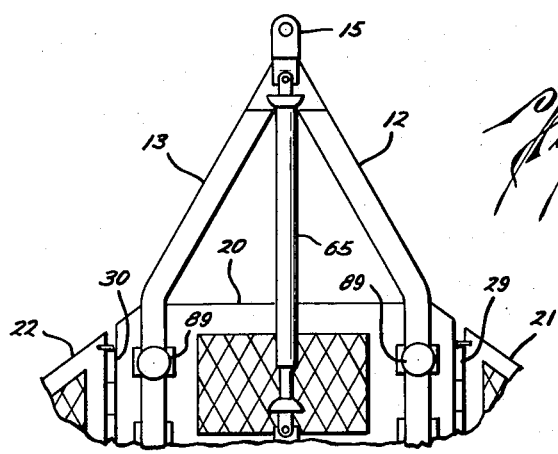
John F. Engler
INVENTOR.
BY
ATTORNEY Dec. 31, 1963 J. F. ENGLER 3,115,738
MOWING DEVICE
Original Filed June 15, 1959 4 Sheets-Sheet 4
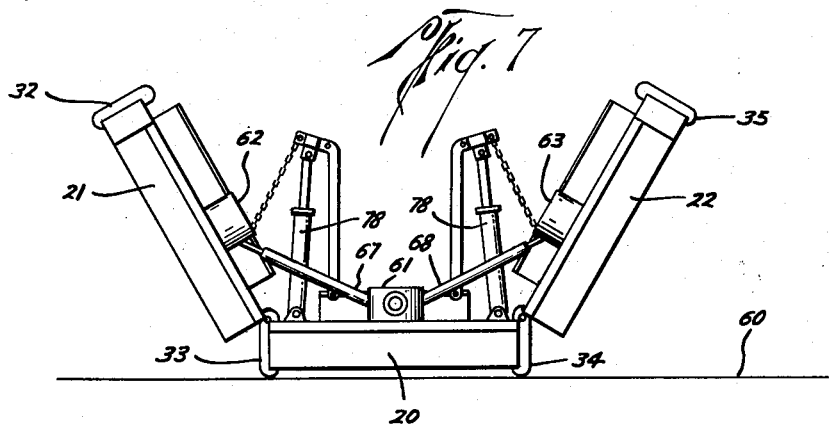
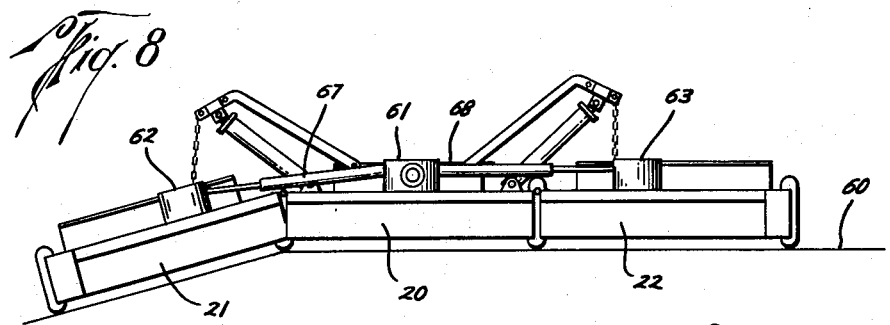
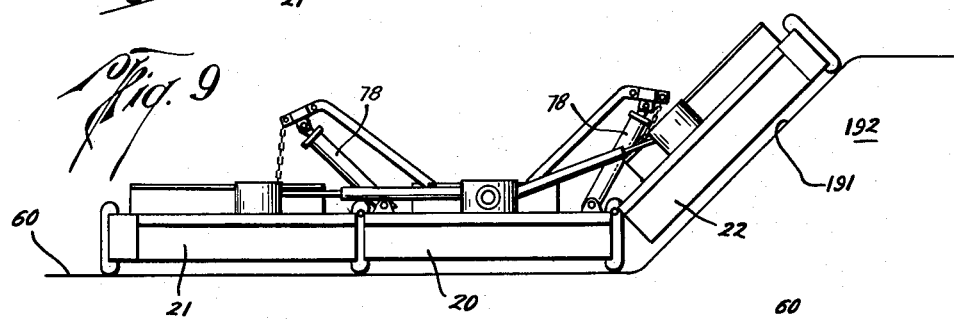
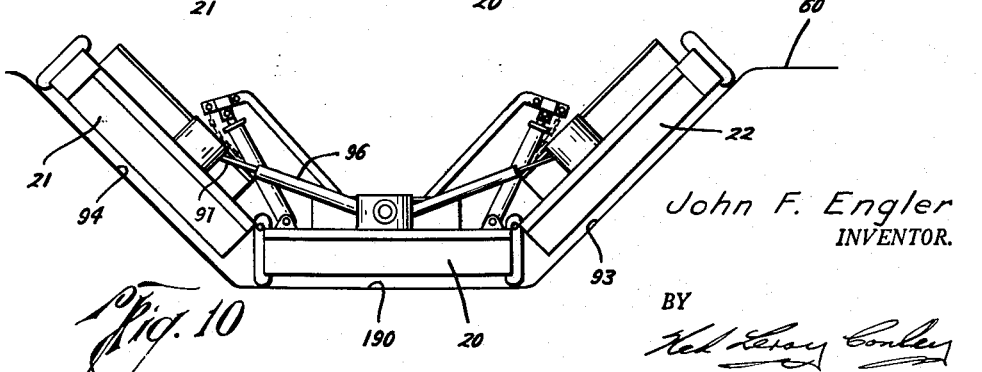
John F. Engler
INVENTOR.
BY
ATTORNEY 3,115,738
MOWING DEVICE
John F. Engler, % Engler Manufacturing Corp.,
P.O. Box 7616, Houston, Tex.
Continuation of application Ser. No. 820,413, June 15, 1959. This application Mar. 28, 1961, Ser. No. 98,893
3 Claims. (Cl. 56—6)

This invention pertains to mowing apparatus, and particularly to combination mowing apparatus of large capacity wherein the width of swath for each pass is increased so that the costs of mowing large areas are significantly decreased.

This application is a continuation of copending application Serial No. 820,413, filed June 15, 1959, and now abandoned, which copending application repeated a substantial portion of and added matter not disclosed in an application copending therewith, Serial No. 670,508, filed July 8, 1957, now Patent No. 2,952,961.

It is a principal object of the invention to provide a mowing device or apparatus of large capacity.

Another object of the invention is to provide such apparatus having multiple overlappingly-disposed cutting means each contributing to the width of swath.

Another object of the invention is to provide mowing apparatus suitable for use on unlevel terrain such as, for example, rice paddies and other ditched fields.

Another object of the invention is to provide mowing apparatus capable of cutting a wide swath which may be towed by a vehicle of relatively low power.

An additional object of the invention is to provide such mowing apparatus which is not susceptible to stalling in heavy brush or bush, and which is relatively unaffected by impact or collision with impediments such as trees, rocks, stones, and the like.

Still another object is to provide a segmented mowing apparatus having means for raising some of the segments out of mowing position.

Yet another object is to provide mowing apparatus having means for maintaining the cutting means at a desired height above the ground on unlevel and uneven terrain.

Another object is to provide mowing apparatus capable of cutting vegetation to a uniform height even when mowing across ditches and other undulating terrain.

Another object is to provide segmented mowing apparatus having means for raising some of the segments to bypass obstructions.

Other objects and advantages of the invention will appear from the following description of a preferred embodiment thereof, reference being made to the accompanying drawings, of which:

FIGURE 1 is a side elevation of a preferred mowing device according to the invention and of a towing vehicle therefor, the latter being indicated by dashed lines;

FIGURE 2 is an enlarged plan view of the mowing device shown in FIGURE 1, the towing vehicle being omitted;

FIGURE 3 is an enlarged vertical section taken at line 3—3 of FIGURE 2;

FIGURE 4 is an enlarged partial view, partly in vertical section, showing the wheel mountings of the device of FIGURES 1–3;

FIGURE 5 is a partial plan view of the front end of the preferred device;

FIGURE 6 is an enlarged front elevation of the device showing a side portion thereof in moved position taken at 6—6 of FIGURE 1; and, FIGURES 7–10 are somewhat schematic front elevations of the device showing how the device is used for cutting vegetation on terrain of differing contour.

Referring now to the drawings in detail, and first to FIGURES 1–6, a mowing apparatus 10 of the preferred form according to the invention is towed or drawn by a powered vehicle 11 such as a tractor or the like. The tongue or draw bar assembly of the mowing device is made up of two angularly disposed curved members 12, 13 which are welded together at their forward ends by means of welds 112 and to which a hitch means 15 is welded at the apex by means of welds 115. The members 12, 13 are each pivotally mounted at 16 for vertical pivoting with relation to the mowing apparatus 10. Powered vehicle 11 has a rear hitch means 18 engageable with the hitch 15 by means of which the connection is made for towing or drawing the mower 10 with the vehicle 11 in the conventional manner.

The body of the mowing apparatus 10 comprises a substantially horizontal, planar body in three sections 20–22, the center section 20 being substantially rectangular, and the side sections 21, 22 having diagonal forward sides 23, 24 respectively. Body sections 20–22 are upwardly flat, and are constructed of steel channel framing members 27 and steel flooring plate members 28. Sections 20–22 are hinge-connected together side by side, the hinge 29 pivotally connecting sections 20, 21 and the hinge 30 pivotally connecting sections 20, 22 at opposite sides of section 20. The hinges extend along the full length of the connected section sides, and permit relative movements between the connected sections of up to about 90° on upward movements and about 20° on downward movements so that the mower body is enabled to flexibly traverse over uneven terrain and still be closely spaced from all surfaces of the terrain.

The body sections 20–22 are movably supported by four wheel assemblies 32–35 each constituting wheel support means. Wheel assemblies 33, 34 are mounted near the rear ends of respective hinges 29, 30, and wheel assemblies 32, 35 are, respectively, at the outer sides of body sections 21, 22 at channel brackets 36, 37 which extend out from the sides of the body sections a short distance so that the wheels are carried beyond the outer sides of the body sections. The placing of the outer wheel assemblies 32, 35 ahead of and out of line with wheel assemblies 33, 34 increases the stability of the mower body so that the evenness of cut is improved.

Each of the wheel assemblies 32–35 is height adjustable. Referring particularly to FIGURE 4, each wheel assembly comprises an arm 40 pivotally mounted at a pin 41 supported stationarily by a perforate flange 42 attached to an I-beam bracket member 36 or 37 for wheel assemblies 32, 35, or to a frame member 27 for wheel assemblies 33, 34. Each arm 40 carries a lateral wheel shaft (see FIGURE 1) upon which a wheel 44 is rotatively mounted, and a flange 45 above the arm and spaced from its pivot end. A double bracket 46 is affixed above the plate 28 of body section 20 or above bracket 36 or 37 in line with each arm 40 and above the arm pivot. A rod 47 pivotally mounted at one end at flange 45 by a pin 48 is threaded at its other end 49. Threaded rod end 49 is adjustably screwed into an internally threaded socket 50 of a boss 51, which extends through a block 52 pin-mounted at bracket 46 by means of a pin 152 (FIGURE 2). Boss 51 has an enlarged flange 53 at the opposite side of block 52. The central cylindrical shank portion of boss 51 is tubular to receive the end of rod 47 and is slidable through a hole through block 52 and is surrounded by a helical compression spring 54 which acts between block 52 and the end of socket 50 which is of larger diameter than the shank portion of boss 51. Boss 51 has a hexagonal end 55 which may be engaged with a wrench to screw socket 50 axially along rod end 49 to adjust the distance between block 52 and pin 48, thereby raising or lowering arm 40 and the wheel 44 carried thereby. This adjustment permits variation of the distance at which body sections 20–22 are carried above the ground surface 60 so that the height of cut of the mower may be adjusted.

Each body section carries a swinging blade mowing assembly. Gear units 61–63 are mounted, respectively, at the centers of the upper surfaces of each of the body sections 20–22, the units being bolted to floor 28 and frame members 27 as shown. Gear unit 61 is driven through a telescoping drive shaft and universal joint assembly 65 which is also connected to the rotative power take-off 66 of vehicle 11, which is usually a small tractor. Gear unit 61 in turn drives gear units 62, 63 to which it is drive-connected by telescoping drive shaft and universal joint assemblies 67, 68, respectively.

Each gear unit 61–63, unit 62 being shown in FIGURE 3 and units 61, 63 being identically arranged, includes a vertical shaft 70 extending through a hole 170 freely past and below the floor element 28 of the body section. At the lower end of each shaft 70 there is connected a circular hub 71 outwardly from the lower surface of which extend rotatable cutting means comprising two doubly-pivotal cutter or mower blades 72. Each blade 72 is pivotally mounted for horizontal movement both at the hub 71, at bolts 73, and at the intermediate joint thereof, at bolts 74. The outer blade sections 75 of each blade 72 are sharpened at each side at 172 for cutting of grass, roots, stems, and brush or other vegetable growths when the blades are swingingly rotated by axial rotation of hub 71.

At the rear of each body section 20, 21, and 22 of the mower, a pivotable flap 76 is attached by means of a hinge 77 extending laterally and horizontally across the back of each body section so that the flap may pivot vertically. This flap functions both as a guard for preventing contact with the blades and consequent accidental injury, and also to retain mowed vegetable growth within the area of blade rotation until it is mulched or shredded. When the amount of mowed vegetable growth builds up until a large quantity is held under the mower, this bulk of material pushes against the flap to raise it, and the mowed material is released.

Referring now particularly to FIGURES 2 and 6, two fluid cylinders 78 are pivotally mounted on the upper surface of floor 28 of body section 20 adjacent hinges 29, 30, respectively, each mounting comprising a pin 79 and clevis 80, whereby the fluid cylinder may pivot laterally with respect to the central body section. On the outer end of piston rod 81 of each fluid cylinder 78, a head member 82 is affixed. Each head member 82 is provided with pins 83, 84 for pivotal attachment of a bar 85 and a flexible connector comprising a chain 86, respectively. Each bar 85 is pivotally attached to central body section 20 at 87, and each chain 86 is attached to one of body sections 21, 22, outwardly of the point of attachment of the fluid cylinder. A brace member 88 provides support for each fluid cylinder 78. Fluid cylinders 78 are single acting cylinders, pressure being applied, by means not shown, below the piston, i.e. at the end opposite the piston rod end. The application of fluid pressure to the cylinder causes piston rod 81 to move upwardly, thereby exerting a force on bar 85 and chain 86, and causing one of body sections 21, 22 to be pivoted upwardly about hinges 29 or 30. The arrangement shown and described is particularly desirable and preferred, since a single-acting cylinder of extremely short stroke may be used to raise one of body sections 21 or 22 to its highest point. Fluid pressure to the cylinders 78 is controlled by valves (not shown) conveniently mounted on the powered vehicle 11. The operator may thus easily raise one or both of sections 21 and 22 to clear obstructions, such as stumps, or to go through a gate without ever slowing or stopping the powered vehicle, and without ever stopping the mowing by the cutter means which are not raised.

According to this invention, means are also provided for raising or lowering the front of the mower. This means comprises two fluid cylinders 89 pivotally mounted on posts 90. Each of posts 90 straddles one of curved members 12, 13 which make up the tongue of the mower, and is mounted, as by welding, near the front of the mower, and forward of the point 16 at which members 12, 13 are pivotally attached to the mower. A pivotable cap 91 comprises the top of each post, and serves as a mounting member for fluid cylinder 89, which may be bolted on. Cap 91 has a central aperture (not shown) for passage of piston rod 92 of the fluid cylinder. Each piston rod 92 is operatively connected to one of curved members 12, 13 which make up the tongue. Fluid lines 93, 94, 95 supply fluid to cylinders 89 through a suitable valve (not shown) conveniently mounted on powered vehicle 11 for remote operation by the driver.

Fluid cylinders 89 provide means for raising or lowering the front of the mower in order to obtain a uniform cutting height when mowing across ditches, ridges, dikes, or other undulating terrain. Thus when the rear wheels of the towing vehicle go into a ditch or other depression, the front of the mower will ordinarily be pulled down so that the cutting elements cut the vegetation adjacent the ditch very short, and sometimes the cutting elements dig in and are damaged severely, especially in rocky soil. With the apparatus of this invention, however, pressure is applied to the fluid cylinder 89 so as to raise the front of the mower with respect to tongue members 12, 13, so that the cutting elements are raised to the desired cutting level. Then when the powered vehicle comes out of the ditch, it will lift the front of the mower so that the cutting elements do not cut the vegetation short enough. Pressure is then applied to the fluid cylinder in the opposite direction to lower the front of the mower with respect to tongue members 12, 13, whereupon the cutting elements are again lowered to the desired cutting level.

Although for the sake of simplicity only one set of fluid lines for cylinders 89 is shown in the drawing, it will be appreciated that means are provided for supplying fluid to both ends of the fluid cylinders, so that force may be applied for moving the piston rod, and thereby the front of the mower, in either direction.

The preferred mowing device herein described is particularly suited for use in mowing unlevel ground such as is found in rice fields and other terrain interwoven by ditches and other surface irregularities. In FIGURE 10, the flexible action of the mower is shown in traversing a ditch 190, and in FIGURE 9 the side 191 of a hump or hill 192. The ditch 190 in FIGURE 10 has steep sides 93, 94, at angles shown at 45°, but which may be even greater, with the horizontal bottom of the ditch as is shown by the positions of the mower sides in FIGURE 7. The powered vehicle 11 (not shown in FIGURE 10) rides the ditch bottom. The center part 20 of the mowing device closely cuts vegetable growth at the bottom of the ditch, while the side parts 21, 22 closely mow the ditch sides 93, 94. All of the vegetation at the sides and bottom of the ditch is trimmed closely, since the nonplane configuration taken by the mower body sections 20–22 is closely adapted to the configuration of the ditch opening.

In FIGURE 8, the mower is shown with right-hand side section 22 and center section 20 mowing level terrain, and with the left-hand section 21 mowing a slope 20° downward from the level terrain, which is about the maximum downward movement permitted by the position of shaft 67.

In FIGURE 9, it is seen that mower body section 22 has moved from its planar position of level ground mowing, as shown at the right-hand side of FIGURE 8, to adapt to the hill 192, while the other body sections 20, 21, unaffected, continue mowing at a horizontal plane.

When operating on terrain such as this, fluid cylinders 78 are not actuated to raise and lower sections 21, 22 to conform to the terrain. Instead, the use of chains 86 allows sections 21, 22 to follow the terrain even in situations such as shown in FIGURES 8, 9, and 10.

This versatility enables the mower to be used in many locations not heretofore capable of being mowed except by more laborious means, as for example by several passes with a narrower mowing device cutting vegetation at a single plane. Further efficiency is realized because of the controlled overlapping of cut of adjacent sections 20, 21, 22. When separate passes are made with a single-cutter mower, the overlapping is uncontrolled and invariably exceeds the controlled overlapping so that some capacity of the mower is wasted at the sides of each pass.

While a mower capable of cutting a fifteen foot wide swatch might be thought unmanageable, such is not the case with the mower herein presented. Because of the simple direct means for supplying driving power to each set of blades of the mower, there is little friction loss so that a greater fraction of the power of vehicle 11 is available for performing useful work. It is to be understood that the work load is a combination of the work done in rotating the cutters to cut the vegetation and the work done in pulling the mower which includes the work of bending over the vegetation as the mower passes over it and also the work of lifting the mower over any hills or other obstacles, especially where the terrain is rough. It has been deemed impossible to operate such a mower with a tractor powered with less than about 60 horsepower, but according to the realization of this invention, a 30 horsepower tractor is fully capable of efficient operation even under adverse conditions of heavy vegetation and rough terrain. Under favorable conditions such as in a pasture even a 20 horsepower tractor can be used.

The telescoping drive shafts 67, 68 each have a tubular portion 96 (FIGURE 10) within which a portion 97 is slidingly disposed and keyed (keys not shown) to prevent relative rotation between the portions 96, 97 of each shaft. The length of the portion 97 which is within portion 96 is variable, depending on the inclination of the side section 21 or 22 relative to the center section 20. At times it may be desirable to use a three-segment telescopic shaft to obtain a greater inclination of the side section. The drive between gear units 61 and gear units 62, 63 is direct regardless of whether the shafts are extended, as in FIGURE 8, or shortened, as in FIGURES 9–10. The absence of low-efficiency drive connections, such as belts or pulleys, between the adjacent mowing sections makes the power efficiency of the gang-mower very high so that the low powered tractor units above-referred to may be used with no deficiency of operating efficiency for the mower. It should be further noted that the drive-efficiency is the same whether the mower is operating on level or unlevel ground.

In addition the diagonal disposition of the curved members 12, 13 and the angular configuration of front sides 23, 24 of the side sections 21, 22 lessens the shock to the mower should a relatively immovable or heavy object such as a tree, post, log or stone be struck while the mower is being towed. The described shapes of the front portions of the mower permit the vehicle 11 to drag the mower past such objects without back and forth maneuvering of the vehicle and mower. The slanted front sides of the mower, when striking an object, cause the mower to slide sideways around the object and continue without hesitation along the swath.

The controlled blade overlapping is best described by reference to FIGURE 2. The center blade, beneath section 20 and gear unit 61 is between and forward of the two sets of side blades beneath sections 21, 22 and gear units 62, 63, respectively. This triangular arrangement permits controlled overlapping from front to back of adjacent sets of blades. This controlled overlapping exists at side-section angles up to about 45° (see FIGURES 8, 9, 10), but when the side-section angle is greater than about 45° (see FIGURE 7), there is a narrow gap between adjacent blade tips.

Referring now again to FIGURE 2, with continuing reference to the other drawings, the mower may also be adapted for use in mowing narrow swaths, and as an "offset" mower for mowing beneath the branches of trees and other overhanging objects. For example, if the pin or rod 130 of hinge 30 is withdrawn, side section 22 may be removed. It is also necessary to uncouple shaft 68. The mower then becomes an offset mower with the offset portion comprising section 21 of the mower. Similarly, left-hand section 22 may be used as an offset, section 21 being removed by withdrawing the pin from hinge 29 and uncoupling shaft 67. Also, both side sections may be removed to provide a narrow drag-type mower comprising only central section 20. The width of the swath cut may, therefore, be changed to the width of either one, two, or three sections of the mower, and an offset mower of two section width comprising the center section and either of the side sections may be used as desired. When either or both of the side sections 21, 22 are removed, the resulting side openings are closed by simple rectangular plates (not shown) having a half-hinge connectible to the remaining half of hinge 29 or 30.

The mower of this invention may also be used for mowing on the edge of ground adjacent a chasm having very steep banks, so that to cut up to the edge of the chasm it is necessary for one of wheels 32, 35 to hang free over the chasm. In such a situation, pressure is applied to one of cylinders 78 to support the overhanging segment of the mower at the desired angle. Vegetation may thereby be cut all the way to the edge of the chasm.

While a preferred embodiment of the invention has been shown and described herein, many modifications thereof may be made by a person skilled in the art without departing from the spirit of the invention, and it is intended to protect by Letters Patent all forms of the invention falling within the scope of the following claims.

I claim:

1. A mowing machine comprising a substantially horizontal planar body, said planar body comprising a central section and a side section disposed laterally to one side of said central section, means pivotally connecting said side section to said central section along a longitudinally extending pivot axis, wheel support means on said body, rotatable cutting means suspended beneath each section, means on said body for driving said cutting means, and fluid operated means mounted on said central section adjacent said pivot axis for pivotally raising said side section, said fluid operated means comprising a substantially vertically disposed fluid cylinder having its lower end pivotally mounted on a fixed pivot extending parallel to said pivot axis, a piston rod extending upwardly from said fluid cylinder, means pivotally connecting the piston rod to the side section at a point laterally outwardly from the pivot point of the fluid cylinder, and means pivotally connecting the piston rod to said central section at a point laterally inwardly from the pivot point of the fluid cylinder, whereby upon extension of said piston rod the side section is elevated and the fluid cylinder is pivoted laterally inwardly.

2. A mowing machine comprising a substantially horizontal planar body, said planar body comprising a central section and a side section disposed laterally to one side of said central section, means pivotally connecting said side section to said central section along a longitudinally extending pivot axis, wheel support means on said body, rotatable cutting means suspended beneath each section, means on said body for driving said cutting means, and fluid operated means mounted on said central section adjacent said pivot axis for pivotally raising said side section, said fluid operated means comprising a substantially vertically disposed fluid cylinder having its lower end pivotally mounted on a fixed pivot extending parallel to said pivot axis, a piston rod extending upwardly from said fluid cylinder, a flexible connector connecting the piston rod to the side section at a point laterally outwardly from the pivot point of the fluid cylinder, and means pivotally connecting the piston rod to said central section at a point laterally inwardly from the pivot point of the fluid cylinder, whereby upon extension of said piston rod the side section is elevated and the fluid cylinder is pivoted laterally inwardly.

3. A mowing device comprising a substantially horizontal planar body, said planar body comprising a central section and two side sections, one disposed laterally to each side of said central section, hinge means on each lateral side of said central section and attached to said side section whereby said side sections are pivotable vertically with respect to said central section, wheel support means on said body, rotatable cutting means suspended beneath each of said body sections and supported thereby, means on said body for driving said cutting means, and independent fluid operated means mounted on each side of said central section adjacent said hinge means for pivotally raising each of said side sections independently to a substantially vertical positon, each said fluid operated means comprising a substantially vertically disposed fluid cylinder having its lower end pivotally mounted on a fixed pivot extending longitudinally of said central section, a piston rod extending upwardly from each fluid cylinder, means pivotally connecting the piston rod of each said fluid cylinder to the adjacent side section at a point laterally outward from the pivot point of the fluid cylinder, and means pivotally connecting the piston rod of each said fluid cylinder to said central section at a point laterally inward from the pivot point of the fluid cylinder, whereby upon extension of one of said piston rods the adjacent side section is elevated and said fluid cylinder is pivoted laterally inwardly.

References Cited in the file of this patent

UNITED STATES PATENTS

| | | |
|---|---|---|
| 2,672,000 | Speiser | Mar. 16, 1954 |
| 2,682,740 | Miller et al. | July 6, 1954 |
| 2,753,674 | Cunningham et al. | July 10, 1956 |
| 2,887,838 | Gudmundsen | May 26, 1959 |
| 2,956,386 | Niemann | Oct. 18, 1960 |
| 2,982,080 | Martin | May 2, 1961 |